US008712967B1

(12) United States Patent
Weaver et al.

(10) Patent No.: US 8,712,967 B1
(45) Date of Patent: *Apr. 29, 2014

(54) SYSTEMS AND METHODS FOR SIMULTANEOUSLY CONFIGURING MULTIPLE INDEPENDENT BACKUPS

(75) Inventors: Thomas Weaver, Orlando, FL (US); Gregory R. Dowers, II, Lake Mary, FL (US); Krishna Kumar, Maharashtra (IN); Jessica Rich, Santee, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/358,245

(22) Filed: Jan. 25, 2012

(51) Int. Cl.
*G06F 17/00* (2006.01)

(52) U.S. Cl.
CPC ........................................ *G06F 17/00* (2013.01)
USPC .......................................................... 707/645

(58) Field of Classification Search
USPC .......... 707/626, 634, 640, 641, 644–654, 661, 707/668; 711/161, 162; 715/700, 744, 762
See application file for complete search history.

(56) References Cited

U.S. PATENT DOCUMENTS

| | | | |
|---|---|---|---|
| 7,634,511 B1 * | 12/2009 | Freiheit et al. | 1/1 |
| 7,647,362 B1 * | 1/2010 | Nachenberg | 707/999.203 |
| 7,937,546 B2 | 5/2011 | Hiraiwa et al. | |
| 8,219,528 B1 * | 7/2012 | Greene et al. | 707/634 |
| 2005/0015662 A1 | 1/2005 | Scanlan | |
| 2010/0077165 A1 * | 3/2010 | Lu et al. | 711/162 |
| 2011/0041004 A1 | 2/2011 | Miwa et al. | |
| 2012/0011408 A1 | 1/2012 | Swamy et al. | |

OTHER PUBLICATIONS

Shawn Barker, Microsoft Active Directory Backup and Recovery in Windows Server, 2008, Copywrite Quest, 2007, 19 Pages.*
Acronis, Active Directory backup and restore with Acronis Backup & Recovery 10, 2000-2009, 1-8.*
Kirk Hartmann Freiheit, et al.; Systems and Methods for Providing Backup Interfaces; U.S. Appl. No. 13/314,517, filed Dec. 8, 2011.
Gregory R. Dowers, II, et al.; Systems and Methods for Navigating Backup Configurations; U.S. Appl. No. 13/314,538, filed Dec. 8, 2011.
Theodore J. Kaiser, IV, et al.; Systems and Methods for Providing Backup Storage Interfaces; U.S. Appl. No. 13/314,557, filed Dec. 8, 2011.
Gregory R. Dowers, II, et al.; Systems and Methods for Displaying Backup-Status Information for Computing Resources; U.S. Appl. No. 13/356,114, filed Jan. 23, 2012.

* cited by examiner

*Primary Examiner* — Jean B Fleurantin
(74) *Attorney, Agent, or Firm* — ALG Intellectual Property, LLC

(57) ABSTRACT

A method for simultaneously configuring multiple independent backups. The method may include (1) identifying a backup environment managed by a backup system, (2) identifying a request from a user to configure a plurality of backups within the backup environment, wherein each backup within the plurality of backups specifies, independent of any other backup, a backup operation to be performed by the backup system on a computing resource within the backup environment, (3) providing a graphical user interface that allows the user to simultaneously configure each backup within the plurality of backups, (4) receiving a request, from the user via the graphical user interface, to simultaneously configure each backup within the plurality of backups, and (5) in response to the request to simultaneously configure each backup within the plurality of backups, independently configuring each backup within the plurality of backups so as to maintain the independence of each backup.

18 Claims, 15 Drawing Sheets

SYSTEMS AND METHODS FOR SIMULTANEOUSLY CONFIGURING MULTIPLE INDEPENDENT BACKUPS

BACKGROUND

In the digital age, organizations increasingly rely on digitally stored data. To protect against data loss, an organization may use one or more backup systems to back up important data.

Due to increasingly complex information technology infrastructures, an organization may create backups for a variety of computing resources, using a variety of methods, and according to a variety of different schedules. Accordingly, an administrator may face a proliferation of backups to manage. In an attempt to facilitate the creation and maintenance of large numbers of backups, traditional backup administration systems may allow an administrator to create and maintain backup templates that allow configuration details specified in the backup templates to be shared across many backups. In this way, an administrator may simultaneously configure multiple backups by configuring the backup template that the backups depend upon.

Unfortunately, the parent-child relationship created between backup templates and dependent backups may introduce complexity and may make future customizations to the dependent backups difficult. For example, a backup administration system may allow an administrator to customize individual backups that depend on a backup template by allowing the administrator to specify configuration details that will thereafter override configuration details from the backup template. This may require the administrator to remember which configuration details are shared and which are overridden. In addition, the administrator may be required to separately customize dependent backups. For these reasons, configuring a large number of backups using traditional backup administration systems may be difficult, time-consuming, and may introduce opportunities for oversight or other human error. Accordingly, the instant disclosure identifies and addresses a need for additional and improved systems and methods for simultaneously configuring multiple independent backups.

SUMMARY

As will be described in greater detail below, the instant disclosure generally relates to systems and methods for providing a graphical user interface that allows a user to simultaneously configure multiple backups for multiple computing resources in a way that maintains the independence of such backups. In one example, a computer-implemented method for performing such a task may include (1) identifying a backup environment managed by a backup system, (2) identifying a request from a user to configure a plurality of backups within the backup environment, wherein each backup within the plurality of backups specifies, independent of any other backup, a backup operation to be performed by the backup system on a computing resource within the backup environment, (3) in response to the request to configure the plurality of backups, providing a graphical user interface that allows the user to simultaneously configure each backup within the plurality of backups, (4) receiving a request, from the user via the graphical user interface, to simultaneously configure each backup within the plurality of backups, and (5) in response to the request to simultaneously configure each backup within the plurality of backups, independently configuring each backup within the plurality of backups so as to maintain the independence of each backup.

In some embodiments, the step of identifying the request from the user to configure the plurality of backups may include identifying a request from the user to create the plurality of backups within the backup environment. In addition, the step of providing the graphical user interface may include allowing the user to create, via the graphical user interface, a backup configuration for the plurality of backups that identifies the backup operation to be performed by the backup system on the computing resource specified by each backup within the plurality of backups. Furthermore, the step of independently configuring each backup within the plurality of backups may include creating, based at least in part on the backup configuration and independent of any other backup within the plurality of backups, each backup within the plurality of backups.

In certain embodiments, the step of allowing the user to create the backup configuration for the plurality of backups may include allowing the user to configure at least one backup option of the backup configuration for the plurality of backups.

In another embodiment, the step of identifying the request from the user to configure the plurality of backups may include identifying a request from the user to modify each backup within the plurality of backups, and the step of providing the graphical user interface may include allowing the user to simultaneously modify at least one backup option of the plurality of backups via the graphical user interface. Furthermore, the step of receiving the request to simultaneously configure each backup within the plurality of backups may include receiving a request, from the user via the graphical user interface, to update at least one modified backup option for each backup within the plurality of backups, and the step of independently configuring each backup within the plurality of backups may include updating, independent of any other backup option of the plurality of backups, the modified backup option for each backup within the plurality of backups such that each backup within the plurality of backups remains independent of any other backup within the plurality of backups.

In some embodiments, the step of allowing the user to simultaneously modify the backup option of the plurality of backups may include displaying to the user via the graphical user interface a number of backups within the plurality of backups that will be affected by a modification to the backup option.

In other embodiments, the step of allowing the user to simultaneously modify the backup option of the plurality of backups may include displaying to the user via the graphical user interface a variation indicator for the backup option that visually indicates whether the backup option varies among any backups within the plurality of backups.

In various embodiments, the step of allowing the user to simultaneously modify the backup option of the plurality of backups may include displaying to the user via the graphical user interface a modification indicator that visually indicates when the backup option has been modified by the user.

In certain embodiments, the step of allowing the user to simultaneously modify the backup option of the plurality of backups may include displaying to the user via the graphical user interface information that identifies which of the plurality of backups will be affected by a modification to the backup option and/or allowing the user to undo the modification to the backup option.

In at least one embodiment, the step of allowing the user to simultaneously modify the backup option of the plurality of backups may include displaying to the user via the graphical user interface a modification summary that identifies a modification to the backup option of the plurality of backups, what backup options have been modified, and/or what backups within the plurality of backups are affected by the modification to backup option of the plurality of backups.

In some embodiments, the method may also include separately tracking, for each backup within the plurality of backups, a modification to the backup option and allowing the user to separately undo, for each backup within the plurality of backups, the modification to the backup option.

In other embodiments, the step of identifying the request from the user to configure the plurality of backups within the backup environment may include allowing the user to select a plurality of computing resources from within the backup environment and identifying a request from the user to configure at least one backup for each of the plurality of computing resources. In this example, the backup for each of the plurality of computing resources may include the plurality of backups.

In one embodiment, a system for implementing the above-described method may include an identification module programmed to (1) identify a backup environment managed by a backup system and (2) identify a request from a user to configure a plurality of backups within the backup environment, wherein each backup within the plurality of backups specifies, independent of any other backup, a backup operation to be performed by the backup system on a computing resource within the backup environment. The system may also include an interface module programmed to (1) provide, in response to the request to configure the plurality of backups, a graphical user interface that allows the user to simultaneously configure each backup within the plurality of backups and (2) receive a request, from the user via the graphical user interface, to simultaneously configure each backup within the plurality of backups. The system may also include a backup-configuration module programmed to, in response to the request to simultaneously configure each backup within the plurality of backups, independently configure each backup within the plurality of backups so as to maintain the independence of each backup. The system may also include at least one processor configured to execute the identification module, the interface module, and the backup-configuration module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a backup environment managed by a backup system, (2) identify a request from a user to configure a plurality of backups within the backup environment, wherein each backup within the plurality of backups specifies, independent of any other backup, a backup operation to be performed by the backup system on a computing resource within the backup environment, (3) in response to the request to configure the plurality of backups, provide a graphical user interface that allows the user to simultaneously configure each backup within the plurality of backups, (4) receive a request, from the user via the graphical user interface, to simultaneously configure each backup within the plurality of backups, and (5) in response to the request to simultaneously configure each backup within the plurality of backups, independently configure each backup within the plurality of backups so as to maintain the independence of each backup.

As will be explained in greater detail below, by allowing a user to simultaneously configure multiple independent backups, the systems and methods described herein may enable the user to efficiently manage complex backups across multiple computing resources without the complexity present with backup templates and shared configuration details. In some examples, these systems and methods may also allow a user to easily customize backups without the need for redundant effort.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
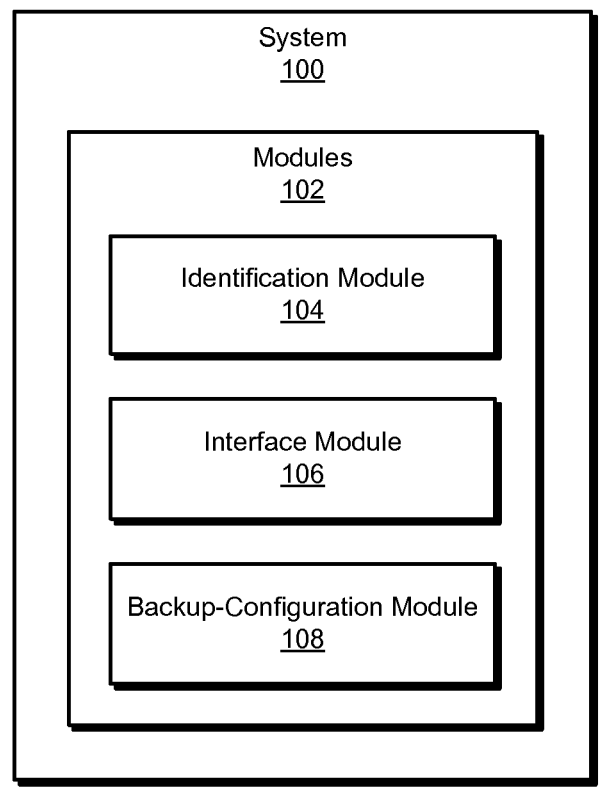
FIG. 1 is a block diagram of an exemplary system for simultaneously configuring multiple independent backups.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
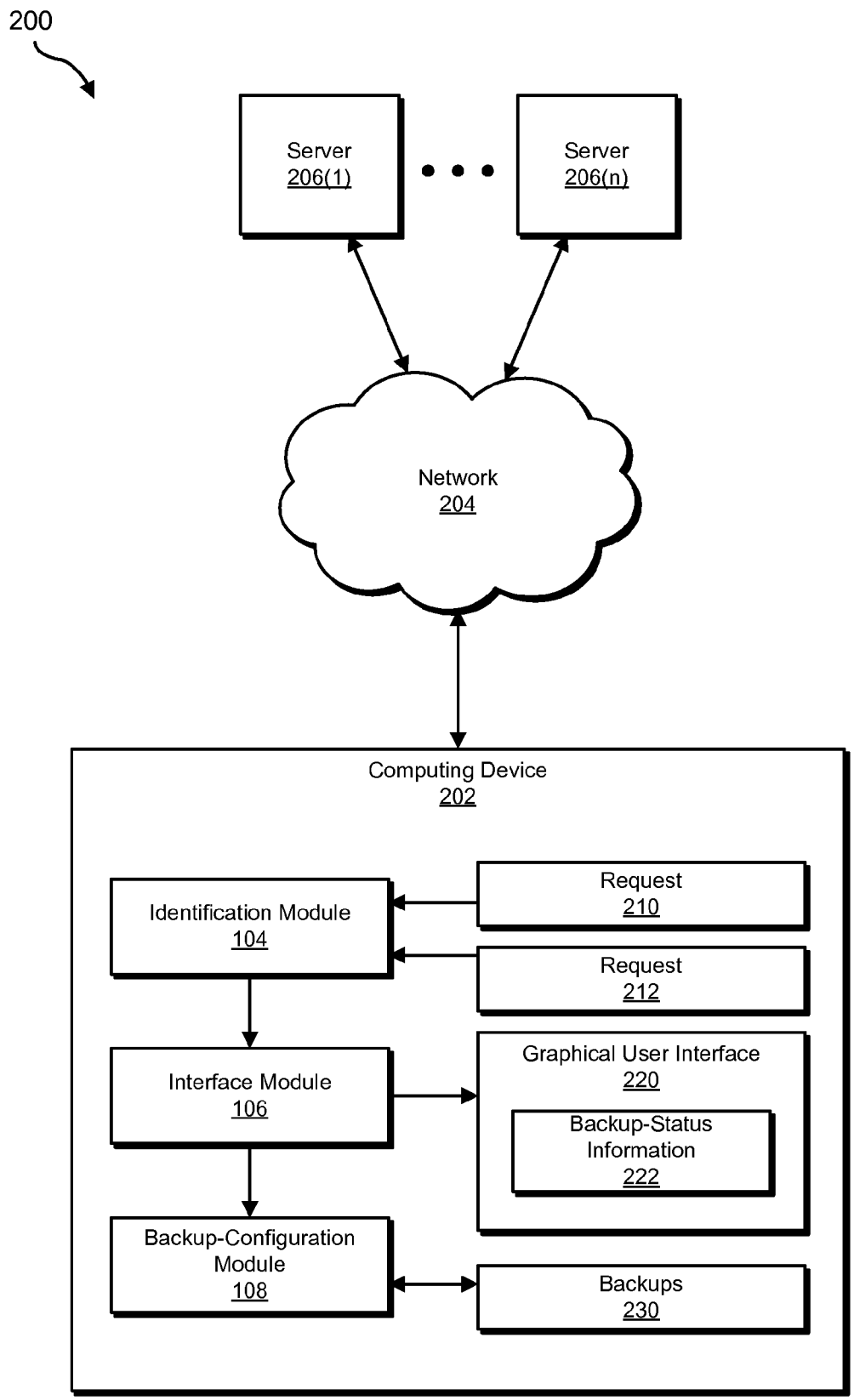
FIG. 2 is a block diagram of an exemplary system for simultaneously configuring multiple independent backups.

The following will provide, with reference to FIGS. 1-2, detailed descriptions of exemplary systems for simultaneously configuring multiple independent backups. Detailed descriptions of corresponding computer-implemented methods will also be provided in connection with FIG. 3. In addition, detailed descriptions of exemplary graphical user interfaces will be provided in connection with FIGS. 4-13. Furthermore, detailed descriptions of an exemplary computing system and network architecture capable of implementing one or more of the embodiments described herein will be provided in connection with FIGS. 14 and 15, respectively.

FIG. 1 is a block diagram of an exemplary system 100 for simultaneously configuring multiple independent backups. As illustrated in this figure, exemplary system 100 may include one or more modules 102 for performing one or more tasks. For example, and as will be explained in greater detail below, exemplary system 100 may include an identification module 104 programmed to (1) identify a backup environment managed by a backup system and (2) identify a request from a user to configure a plurality of backups within the backup environment. Exemplary system 100 may also include an interface module 106 programmed to (1) provide a graphical user interface that allows the user to simultaneously configure each backup within the plurality of backups and (2) receive a request, from the user via the graphical user interface, to simultaneously configure each backup within the plurality of backups.

In addition, and as will be described in greater detail below, exemplary system 100 may include a backup-configuration module 108 programmed to independently configure each backup within the plurality of backups so as to maintain the independence of each backup. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or servers 206(1)-(n)), computing system 1410 in FIG. 14, and/or portions of exemplary network architecture 1500 in FIG. 15. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with servers 206(1)-(n) via a network 204.

In one embodiment, one or more of modules 102 from FIG. 1 may, when executed by at least one processor of computing device 202, enable computing device 202 to provide a graphical user interface to a user that allows the user to simultaneously configuring multiple independent backups. For example, and as will be described in greater detail below, one or more of modules 102 may cause computing device 202 to (1) identify a backup environment (e.g., system 200) managed by a backup system (e.g., computing device 202), (2) identify a request (e.g., request 210) from a user to configure a plurality of backups within the backup environment, wherein each backup within the plurality of backups specifies, independent of any other backup, a backup operation to be performed by the backup system on a computing resource (e.g., one of servers 206(1)-(n)) within the backup environment, (3) in response to the request to configure the plurality of backups, provide a graphical user interface (e.g., graphical user interface 220 that allows the user to simultaneously configure each backup within the plurality of backups, (4) receive a request (e.g., request 212), from the user via the graphical user interface, to simultaneously configure each backup within the plurality of backups, and (5) in response to the request to simultaneously configure each backup within the plurality of backups, independently configure each backup within the plurality of backups so as to maintain the independence of each backup.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 1410 in FIG. 14, or any other suitable computing device. In at least one example, system 200 may represent a backup environment and computing device 202 may represent a backup central administration server that is used to monitor and manage independent backups of servers 206(1)-(n).

Servers 206(1)-(n) generally represent any type or form of computing device that is capable of storing, managing and/or processing data. Examples of servers 206(1)-(n) include, without limitation, application servers and database servers configured to provide various database services and/or run certain software applications. In at least one example, system 200 may represent a backup environment and servers 206(1)-(n) may represent computing resources that may be backed up by a backup system.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 1500 in FIG. 15, or the like. Network 204 may facilitate communication or data transfer using wireless or wired connections. In one embodiment, network 204 may facilitate communication between computing device 202 and servers 206(1)-(n).

Figure 3:
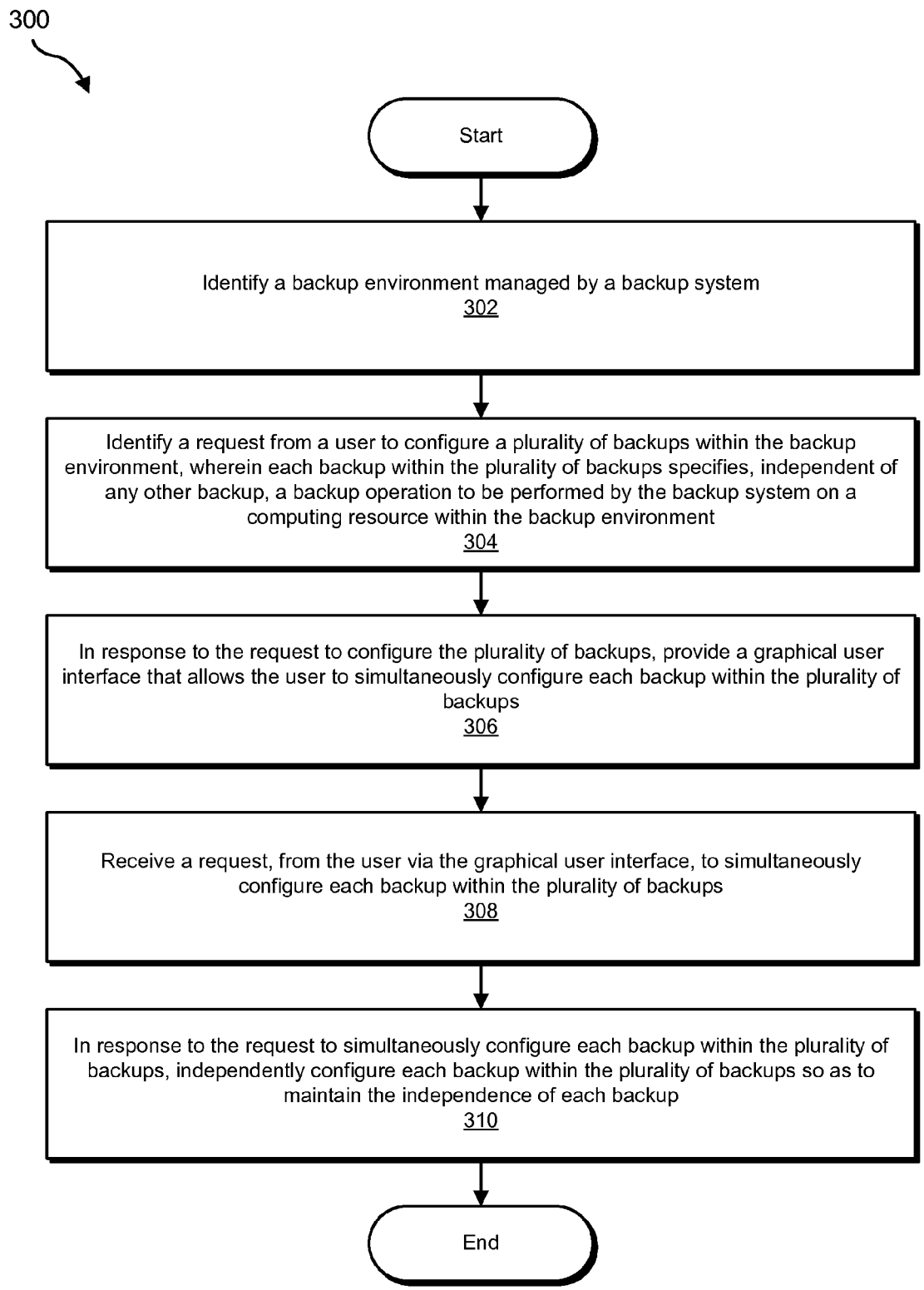
FIG. 3 is a flow diagram of an exemplary method for simultaneously configuring multiple independent backups.

FIG. 3 is a flow diagram of an exemplary computer-implemented method 300 for simultaneously configuring multiple independent backups. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 1410 in FIG. 14, and/or portions of exemplary network architecture 1500 in FIG. 15.

At step 302, one or more of the systems described herein may identify a backup environment managed by a backup system. For example, identification module 104 may, as part of computing device 202, identify at least one of servers 206(1)-(n) managed by computing device 202.

As used herein, the term "backup environment" may generally refer to any collection of computing resources (e.g., within an enterprise, an information technology infrastructure, etc.) subject to backup management via a backup system. In addition, the term "computing resource," as used herein, may refer to any computing resource that includes and/or uses data. Examples of computing resources may include, without limitation, servers, databases, applications, and/or volumes. In some examples, the term "computing resource" may refer to a resource that may be backed up. In addition, the term "backup system," as used herein, may refer to any system for backing up data and/or any system used to create, modify, manage, monitor and/or perform backups. In some examples, the backup system may also replicate, archive, migrate, and/or virtualize data.

Identification module 104 may identify the backup environment managed by the backup system in a variety of ways. For example, identification module 104 may access backup configuration data of the backup environment (e.g., backups 230) to identify computing resources that are subject to being backed up by the backup system. Additionally or alternatively, identification module 104 may access network topology information identifying one or more computing resources on a network.

At step 304, one or more of the systems described herein may identify a request from a user to configure a plurality of backups within the backup environment, wherein each backup within the plurality of backups specifies, independent of any other backup, a backup operation to be performed by the backup system on a computing resource within the backup environment. For example, identification module 104 may identify request 210.

As used herein, the term "backup" may generally refer to any configuration, script, and/or specification for performing one or more backup operations. For example, a backup may include backup configuration information that specifies a computing resource to back up, what backup operations should be performed on the computing resource, how the backup operations should be performed, how often the backup operations should be performed and/or how backed up data should be stored by a backup system. In some examples, a computing resource within a backup environment may have more than one backup associated with it. In this way, a user may back up the same computing resource using a variety of backup configurations and according to a variety of different schedules.

As used herein, the term "independent backup" may generally refer to any backup that specifies, independent of any other backup, a backup operation to be performed by the backup system on a computing resource. In some examples, an independent backup may also refer to any backup that may be independently modified without affecting any other backup and/or that is not affected by independent modifications made to other sources of backup configuration information. In other examples, an independent backup may refer to any backup that specifies, independent of any other backup, a backup operation to be performed by the backup system on a single computing resource.

In addition, the term "backup operation," as used herein, may include any operation for backing up, protecting, transferring, and/or replicating data. Examples of backup operations include, without limitation, backing up data (e.g., to a disk, a tape, a deduplication data store, etc.), duplicating data (e.g., to a disk, a tape, etc.), archiving data, migrating data, creating a virtual copy of a system, etc.

Identification module 104 may identify the request from the user to configure the plurality of backups within the backup environment in a variety of ways. For example, identification module 104 may allow a user to identify a plurality of backups within a backup environment that the user would like to create and/or modify. Additionally or alternatively, identification module 104 may allow the user to identify one or more computing resources that the user would like to backup or specify that the user would like to modify the configuration by which the identified computing resources are backed up.

In some examples, identification module 104 may allow the user to select or identify a plurality of computing resources from within the backup environment and then allow the user to request to configure at least one backup for each of the plurality of computing resources. In this example, the backup for each of the plurality of computing resources may include the plurality of backups. For example, as will be described in greater detail below, interface module 106 may display, to the user within a graphical user interface, a list of computing resources and may allow the user to request to configure at least one backup for one or more computing resources within the list of computing resources. In this example, identification module 104 may identify the request to configure at least one backup for one or more computing resources.

In one example, identification module 104 may identify the request from the user to configure the plurality of backups by identifying a request from the user to create the plurality of backups within the backup environment. In another example, identification module 104 may identify the request from the user to configure the plurality of backups by identifying a request from the user to modify each backup within the plurality of backups. For example, the user may request to modify the way in which the plurality of independent backups are configured to backup one or more computing resources.

At step 306, one or more of the systems described herein may, in response to the request to configure the plurality of backups, provide a graphical user interface that allows the user to simultaneously configure each backup within the plurality of backups. For example, interface module 106 may provide graphical user interface 220 that may allow the user to simultaneously configure each backup within the plurality of backups.

Interface module 106 may allow the user to simultaneously configure each backup within the plurality of backups in a variety of ways. In one example, interface module 106 may respond to a request to create a plurality of backups by allowing a user to create, via the graphical user interface, a backup configuration for the plurality of backups that identifies one or more backup operations to be performed by the backup system on the computing resource specified by each backup within the plurality of backups. In this way, the user may simultaneously create and configure a plurality of independent backups based on the same backup configuration. In one example, interface module 106 may allow the user to specify one or more generic backup options (e.g., a backup option applicable to every computing resources specified by the plurality of backups) for the backup configuration.

In addition to allowing a user to create independent backups, interface module 106 may also allow a user to configure the backup configuration for the plurality of backups by allowing the user to configure at least one backup option of the backup configuration for the plurality of backups. As used herein, the term "backup configuration" may refer to a collection of backup options that determine the time and manner in which backup operations will be performed by the backup system on a computing resource within the backup environment.

In addition to allowing a user to simultaneously create a plurality of backups via a graphical user interface, interface module 106 may allow the user to simultaneously modify a plurality of backups via a graphical user interface. For example, interface module 106 may respond to a request to modify a plurality of backups by allowing the user to simultaneously modify at least one backup option of the plurality of backups via the graphical user interface. Additional examples and explanations illustrating how interface module 106 may allow the user to simultaneously modify a plurality of backups via a graphical user interface will be provided below in connection with FIGS. 8-13.

In some examples, interface module 106 may display to the user via the graphical user interface a number of backups within the plurality of backups that will be affected by a modification to a backup option. An example of how interface module 106 may display to the user via the graphical user interface a number of backups within the plurality of backups that will be affected by a modification to a backup option will be provided below in connection with FIG. 10.

Because backup options of each backup within the plurality of backups may differ, interface module 106 may also provide information to the user via the graphical user interface that indicates the differences. For example, interface module 106 may display to the user via the graphical user interface a variation indicator for any backup option that visually indicates whether the backup option varies among any backups within the plurality of backups. In one example, the variation indicator may include a word such as "Various". In another example, the variation indicator may include an intermediate or tri-state checkbox (e.g., a checkbox with a square or dash inside).

While a user modifies backup options within the graphical user interface, interface module 106 may indicate to the user which backup options have been modified. For example, interface module 106 may display to the user via the graphical user interface (e.g., next to a modified backup option) a modification indicator that visually indicates when a backup option has been modified by the user. An example of a modification indicator that visually indicates when a backup option has been modified by the user will be provided below in connection with FIGS. 11-12.

After a user modifies a backup option, a user may wish to know which backups within the plurality of backups have been affected, and/or the user may wish to undo the modification. In one example, interface module 106 may display to the user via the graphical user interface information that identifies which of the plurality of backups will be affected by a modification to the backup option and/or may allow the user to undo the modification to the backup option. In some examples, a user may request this information by interacting with a modification indicator. An example of a graphical user interface for displaying information that identifies affected backups and that allows a user to undo modifications made to backup options will be provided below in connection with FIG. 13.

In certain examples, interface module 106 may display to the user via the graphical user interface a modification summary that identifies a modification to the backup option of the plurality of backups, what backup options have been modified, and/or what backups within the plurality of backups are affected by the modification to backup option of the plurality of backups.

At step 308, one or more of the systems described herein may receive a request, from the user via the graphical user interface, to simultaneously configure each backup within the plurality of backups. For example, interface module 106 may receive request 212, from the user via graphical user interface 220, to simultaneously configure each backup within the plurality of backups.

Interface module 106 may receive the request from the user via the graphical user interface in a variety of ways. For example, interface module 106 may receive the request from the user via the graphical user interface as the result of the user interacting with an interface element within the graphical user interface (e.g., a button). Additionally or alternatively, interface module 106 may receive the request from the user via the graphical user interface as the result of the user modifying a backup option using the graphical user interface.

In some embodiments, interface module 106 may receive the request to simultaneously configure each backup within the plurality of backups by receiving a request, from the user via the graphical user interface, to create, based at least in part on the backup configuration created as part of step 306, each backup within the plurality of backups. In other embodiments, interface module 106 may receive the request to simultaneously configure each backup within the plurality of backups by receiving a request, from the user via the graphical user interface, to update at least one modified backup option for each backup within the plurality of backups.

At step 310, one or more of the systems described herein may, in response to the request to simultaneously configure each backup within the plurality of backups, independently configure each backup within the plurality of backups so as to maintain the independence of each backup. For example, backup-configuration module 108 may, in response to the request to simultaneously configure each backup within the plurality of backups, independently configure each backup within the plurality of backups so as to maintain the independence of each backup.

Backup-configuration module 108 may independently configure each backup within the plurality of backups so as to maintain the independence of each backup in a variety of ways. In one example, backup-configuration module 108 may independently configure each backup within the plurality of backups by creating, based at least in part on the backup configuration created as part of step 306, each backup within the plurality of backups, wherein each backup within the plurality of backups is created independent of any other backup within the plurality of backups.

In another example, backup-configuration module 108 may independently configure each backup within the plurality of backups by updating, independent of any other backup option of the plurality of backups, the modified backup option for each backup within the plurality of backups, wherein each backup within the plurality of backups remains independent of any other backup within the plurality of backups. For example, backup-configuration module 108 may update, for each backup within the plurality of backups, only the modified backup option.

In other examples, backup-configuration module 108 may also separately track, for each backup within the plurality of backups, a modification to the backup option and/or allow the user to separately undo, for each backup within the plurality of backups, the modification to the backup option. For example, backup-configuration module 108 may store with each backup within the plurality of backups information that identifies a modifications made to the backup so that the modification may later be undone by the user.

FIGS. 4-7 illustrate how interface module 106 may provide a graphical user interface that allows a user to create a backup configuration for a plurality of backups. The following discussion provides an example of how a user may interact with a graphical user interface to simultaneously create and configure independent backups for three servers.

Figure 4:
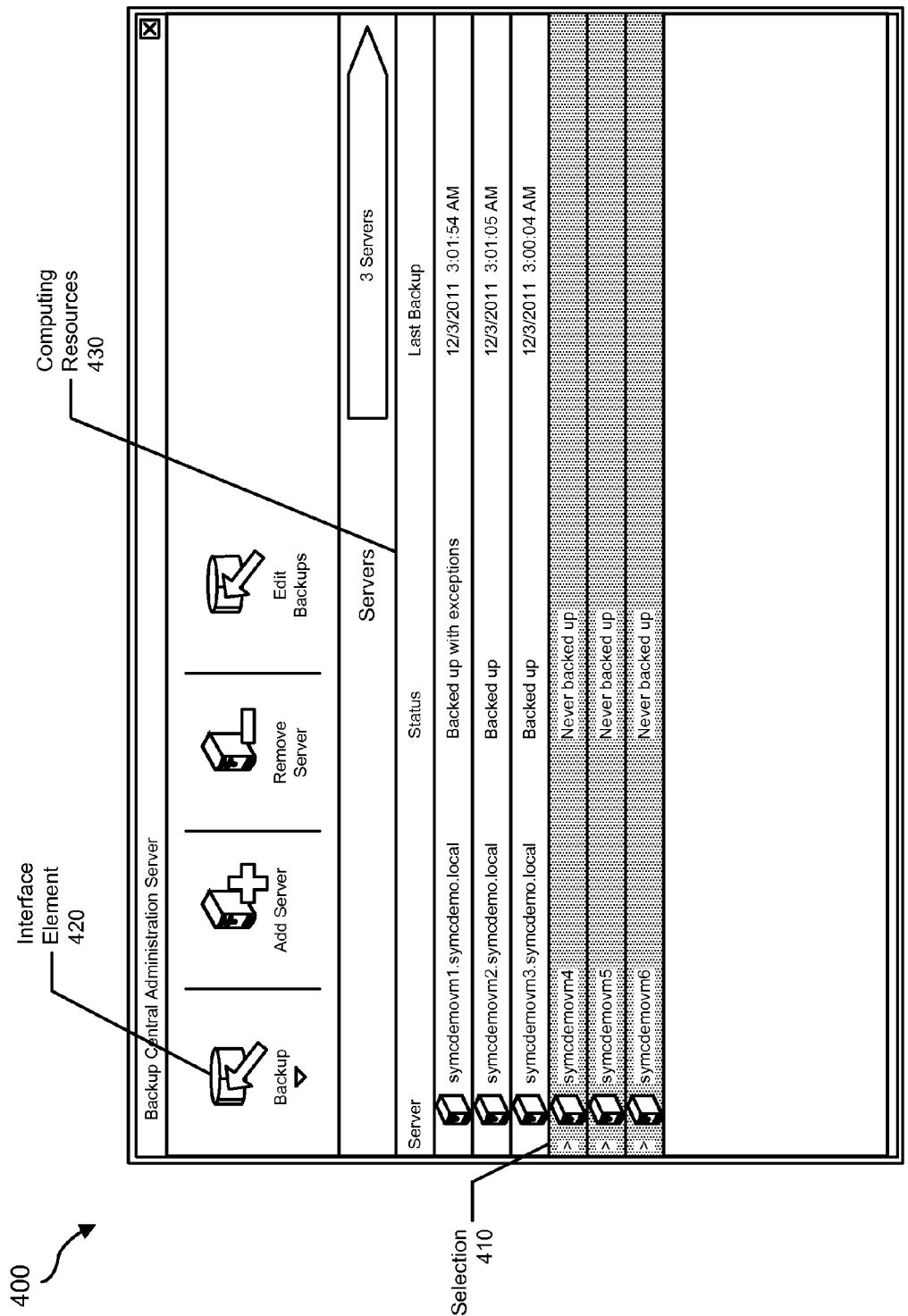
FIG. 4 is a diagram of an exemplary graphical user interface for simultaneously configuring multiple independent backups.

FIG. 4 is an illustration of an exemplary graphical user interface 400. As shown in FIG. 4, graphical user interface 400 may allow a user to simultaneously create independent backups for multiple computing resources. In this example, a user may make a selection 410 of multiple computing resources (e.g., servers "symcdemovm4," "symcdemovm5," and "symcdemovm6") from among the computing resources displayed in computing resources 430. The user may then interact with an interface element 420 (by, e.g., clicking a backup button) to request to create an independent backup for each of the selected computing resources. In response to this request, interface module 106 may display, to the user, graphical user interface 500 in FIG. 5.

Figure 5:
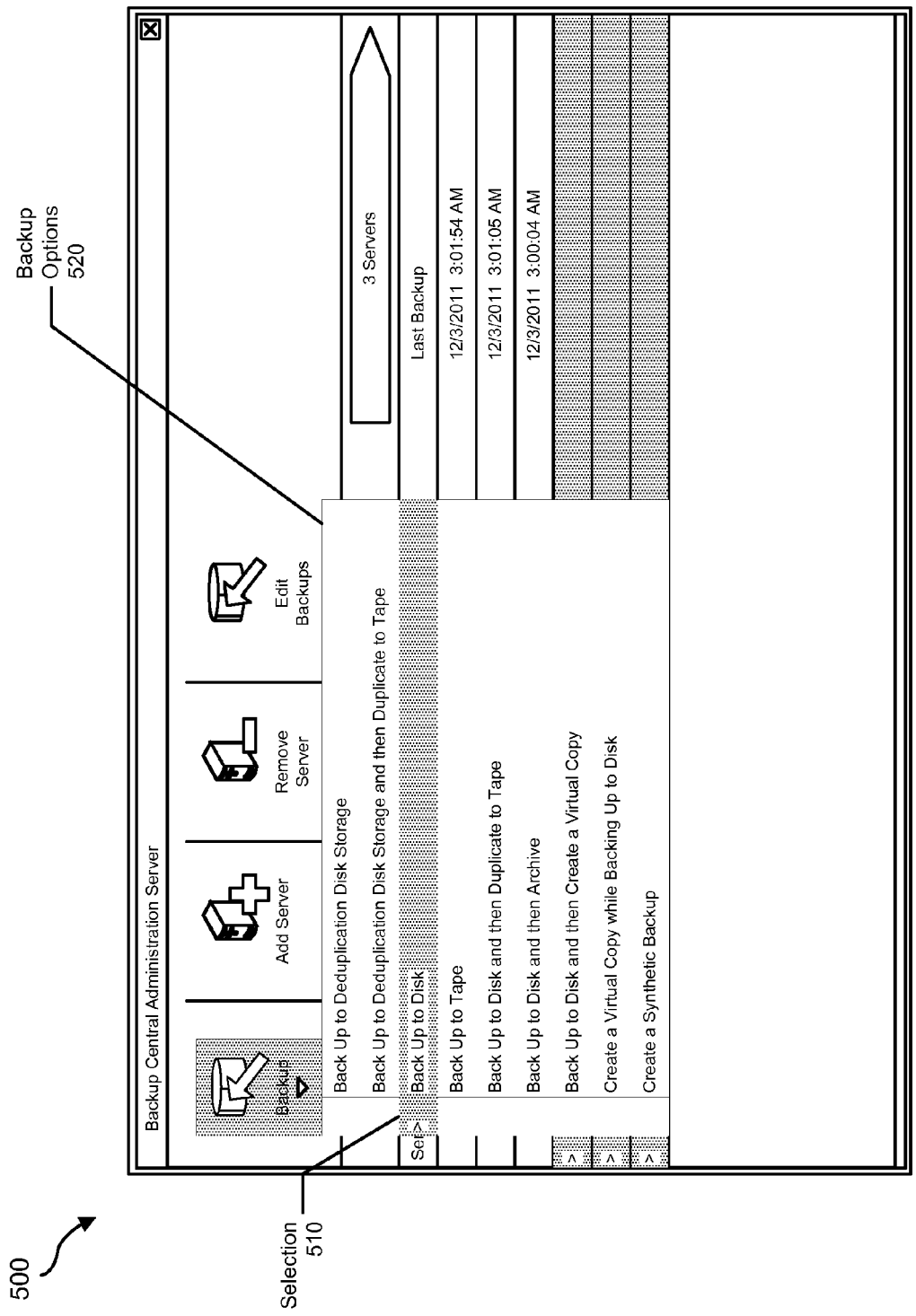
FIG. 5 is a diagram of an exemplary graphical user interface for simultaneously configuring multiple independent backups.

FIG. 5 is an illustration of an exemplary graphical user interface 500. As shown in FIG. 5, graphical user interface 500 may allow a user to configure a backup configuration for a plurality of backups by allowing the user to configure at least one backup option of the backup configuration for the plurality of backups. In this example, interface module 106 may display to the user a list of backup options 520, after which the user may make a selection 510 of backup options 520 (e.g., "Back Up to Disk"). In response to selection 510, interface module 106 may display, to the user, graphical user interface 600 in FIG. 6.

Figure 6:
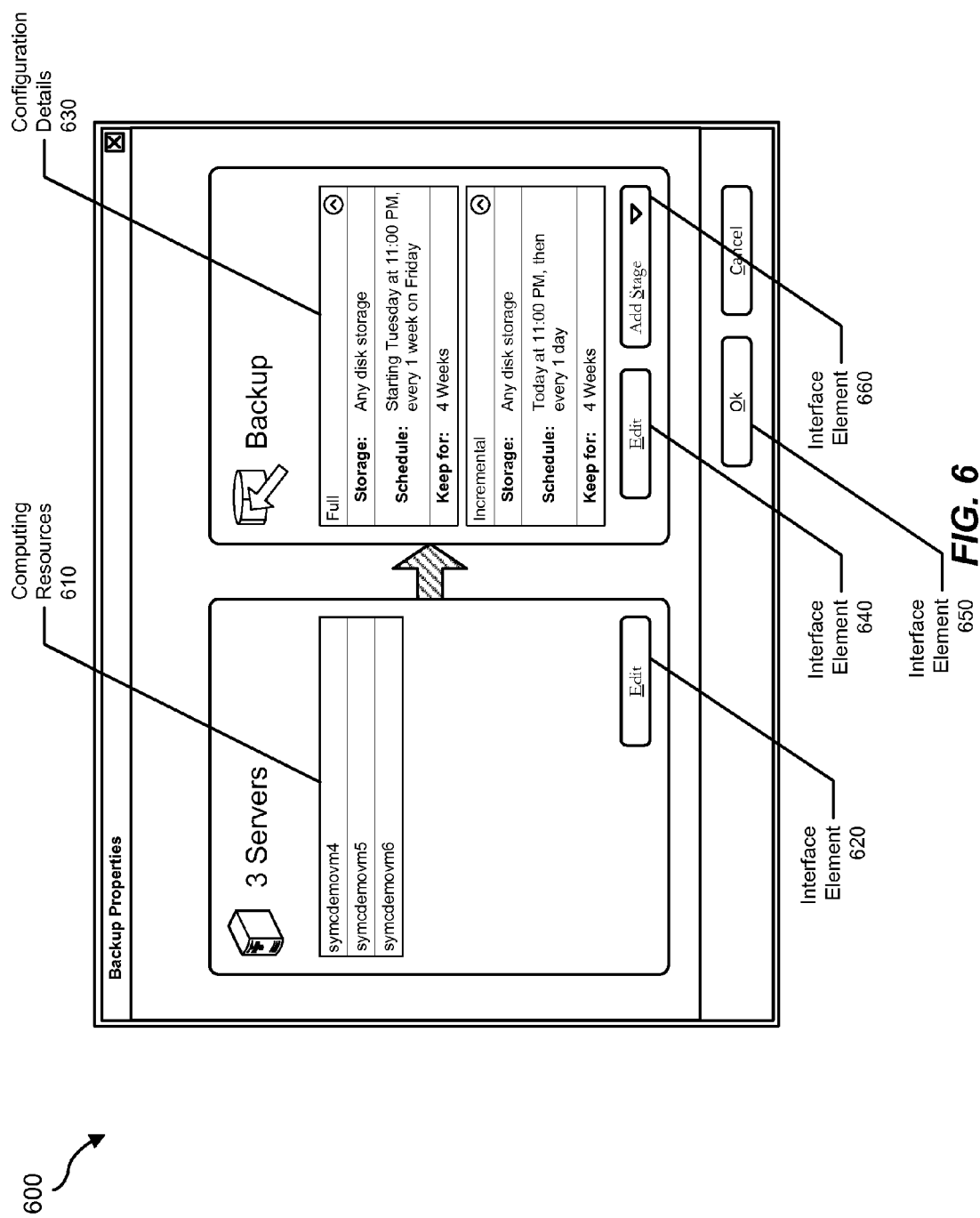
FIG. 6 is a diagram of an exemplary graphical user interface for simultaneously configuring multiple independent backups.

FIG. 6 is an illustration of an exemplary graphical user interface 600. As shown in FIG. 6, interface module 106 may allow the user to further configure the backup configuration for the plurality of backups by allowing the user to configure additional backup options of the backup configuration. Exemplary graphical user interface 600 may include a list of computing resources 610 that identifies the computing resources that will have backups created based on the backup configuration. In one example, the user may interact with an interface element 620 (by, e.g., clicking an edit button) to add or remove a computing resource from the list of computing resources 610.

Exemplary graphical user interface 600 may also include configuration details 630 that summarize the backup options of the backup configuration. For example, as shown in FIG. 6, configuration details 630 may indicate that backup configuration is configured to perform a full backup and an incremental backup. The user may interact with an interface element 650 (by, e.g., clicking an ok button) to request to create an independent backup for each of the servers identified in computing resources 610.

Before submitting the request to create the independent backups, interface module 106 may allow the user to edit the backup configuration and/or add additional stages (e.g., a deduplication stage or a verification stage) to the backup configuration. For example, the user may interact with an interface element 660 (by, e.g., clicking an add stage button) to add one or more stages to the backup configuration, or the user may interact with an interface element 640 (by, e.g., clicking an edit button) to configure one or more backup options of the full and incremental backups. In response to a request to configure one or more backup options of the full backup, interface module 106 may display, to the user, graphical user interface 700 in FIG. 7.

Figure 7:
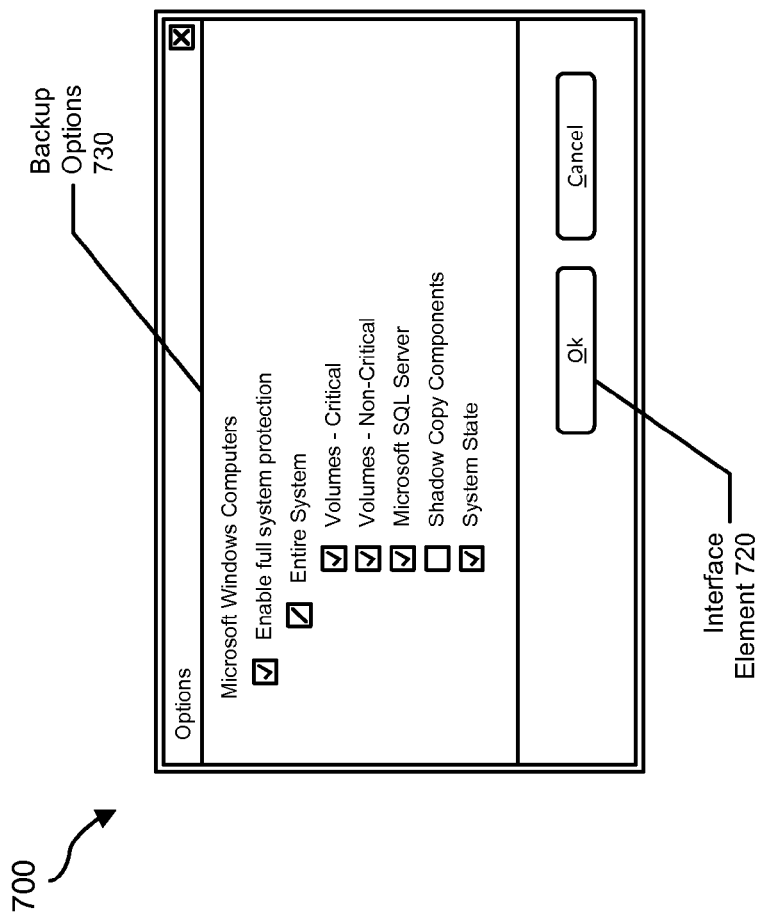
FIG. 7 is a diagram of an exemplary graphical user interface for simultaneously configuring multiple independent backups.

FIG. 7 is an illustration of an exemplary graphical user interface 700. As shown in FIG. 7, interface module 106 may allow a user to configure at least one generic backup option for the full backup. In this example, a user may configure one or more of backup options 730. For example, the user may configure the full backup to include "Volumes—Critical", "Volumes—Non-Critical", "MICROSOFT SQL Server", and "System State". In some examples, the user may then interact with an interface element 720 (by, e.g., clicking an ok button) to complete the process of configuring the full backup.

FIGS. 8-13 illustrate how interface module 106 may provide a graphical user interface that allows a user to simultaneously modify a plurality of backups. The following discussion provides an example of how a user may interact with a graphical user interface to simultaneously modify the independent backups of three servers.

Figure 8:
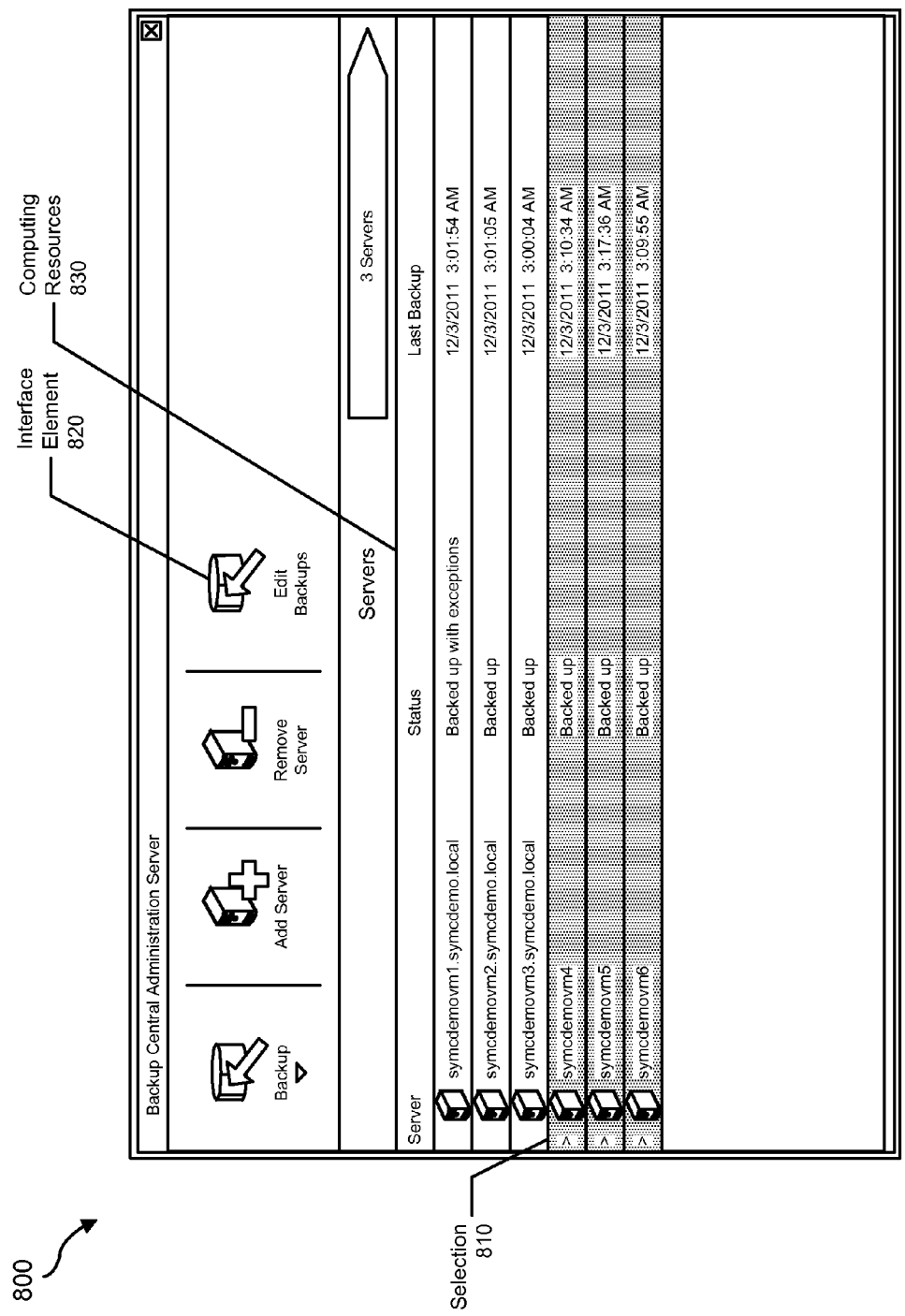
FIG. 8 is a diagram of an exemplary graphical user interface for simultaneously configuring multiple independent backups.

FIG. 8 is an illustration of an exemplary graphical user interface 800. As shown in FIG. 8, graphical user interface 800 may allow a user to select independent backups associated with multiple computing resources. In this example, a user may make a selection 810 of computing resources (e.g., severs "symcdemovm4," "symcdemovm5," and "symcdemovm6") from among the computing resources displayed in computing resources 830. In some examples, the user may then interact with an interface element 820 (by, e.g., clicking an edit backup button) to request to modify one or more independent backups associated with each of the computing resources in selection 810. In response to this request, interface module 106 may display, to the user, graphical user interface 900 in FIG. 9.

Figure 9:
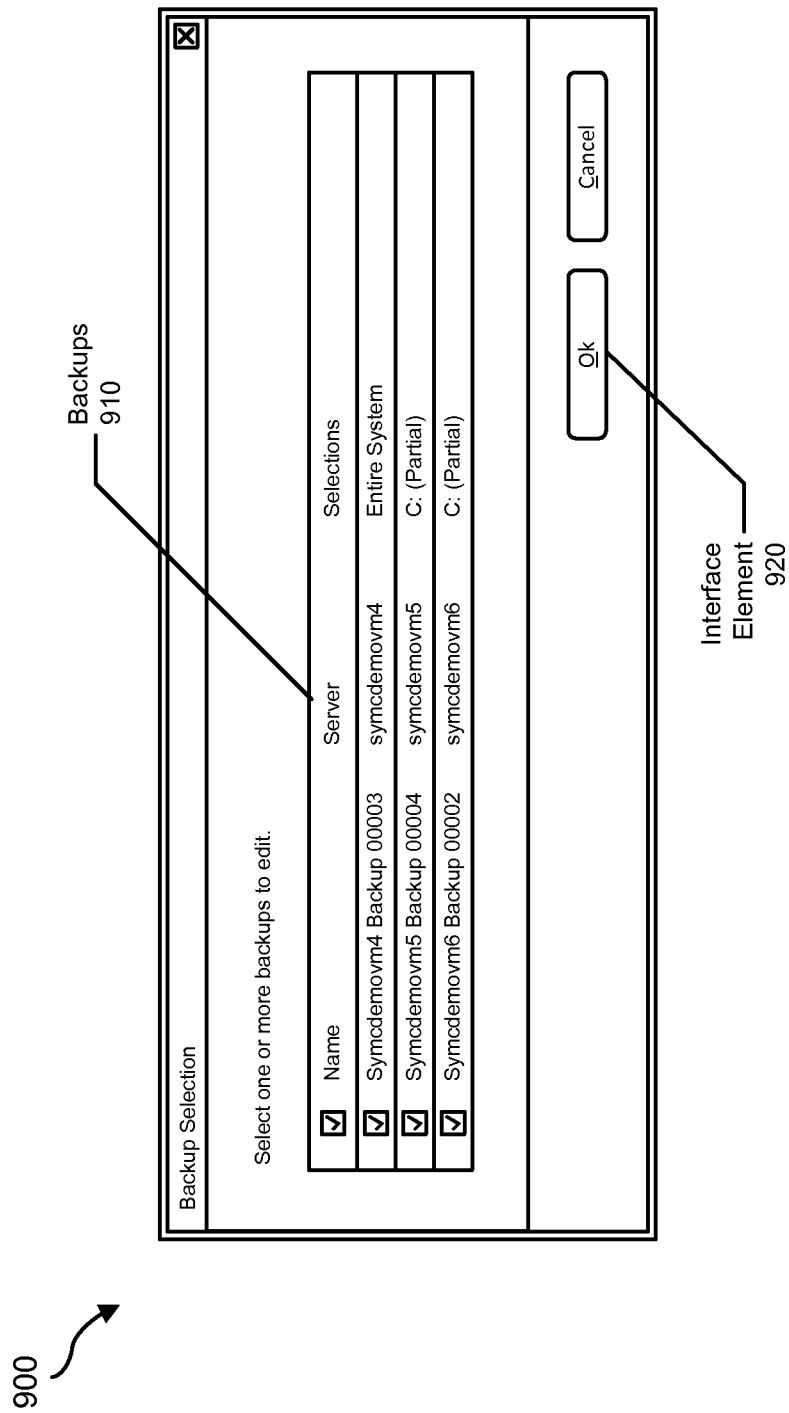
FIG. 9 is a diagram of an exemplary graphical user interface for simultaneously configuring multiple independent backups.

FIG. 9 is an illustration of an exemplary graphical user interface 900. As shown in FIG. 9, exemplary graphical user interface 900 may allow a user to select one or more backups associated with each of the servers identified by selection 810 in FIG. 8. In this example, graphical user interface 900 indicates that there are three backups associated with the three servers identified by selection 810 in FIG. 8 (on backup per server). The user may indicate which of these backups the user would like to modify by selecting and/or deselecting the checkbox next to each backup. In some examples, the user may then interact with an interface element 920 (by, e.g., clicking an ok button) to complete the backup selection process. In response to this request, interface module 106 may display, to the user, graphical user interface 1000 in FIG. 10.

Figure 10:
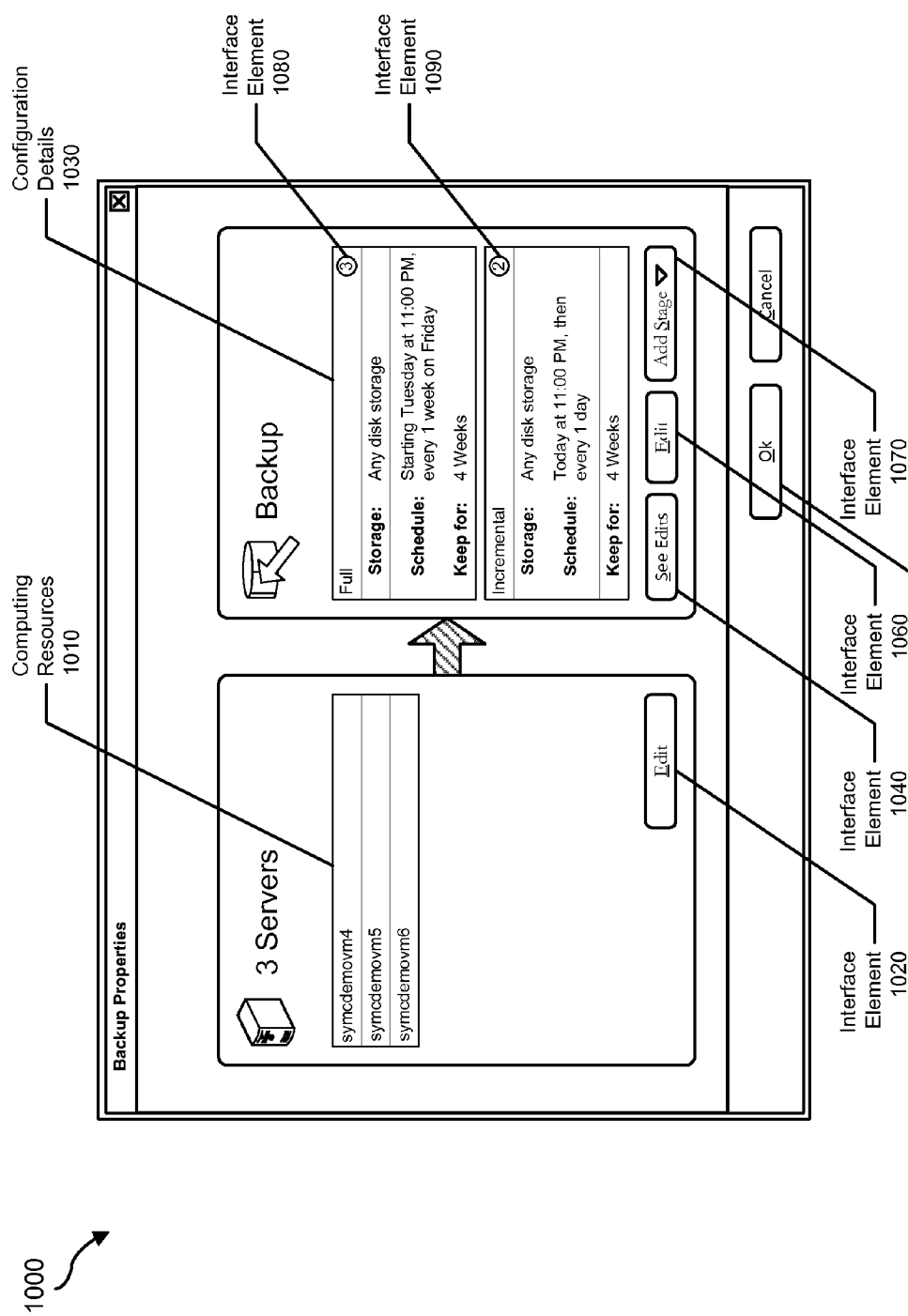
FIG. 10 is a diagram of an exemplary graphical user interface for simultaneously configuring multiple independent backups.

FIG. 10 is an illustration of an exemplary graphical user interface 1000. As shown in FIG. 10, exemplary graphical user interface 1000 may include a list of computing resources 1010 that identifies each server for which a backup is able to be modified and indicates that these servers may be affected by any modifications made to backup options. In one example, the user may interact with an interface element 1020 (by, e.g., clicking an edit button) to add or remove a backup of a computing resource (e.g., using exemplary graphical user interface 900 as described above).

Exemplary graphical user interface 1000 may also include configuration details 1030 that may provide a summary of the backup configurations of the independent backups being modified. For example, as shown in FIG. 10, configuration details 1030 may indicate that the backups are configured to perform a full backup and an incremental backup.

In addition to showing a summary of the backup configuration, configuration details 1030 may include interface elements 1080-1090 that indicate the number of backups that will be affected by modifications to certain backup options. In this example, interface element 1080 indicates that three backups will be affected by any modification to full backup options, and interface element 1090 indicates that two backups will be affected by any modification to incremental backup options.

In some examples, interface module 106 may allow the user to edit one or more backup options and/or add additional stages (e.g., a deduplication stage or a verification stage) to backup configurations of the independent backups being modified. For example, the user may interact with an interface element 1070 (by, e.g., clicking an add stage button) to add one or more stages to the backup configurations.

In other examples, the user may further interact with an interface element 1060 (by, e.g., clicking an edit button) to configure one or more backup options of the full and incremental backups. In response to this request, interface module 106 may display, to the user, graphical user interface 1100 in FIG. 11.

After making any desired modifications to backup options, the user may interact with an interface element 1050 (by, e.g., clicking an ok button) to request to update each backup affected by the modifications.

Figure 11:
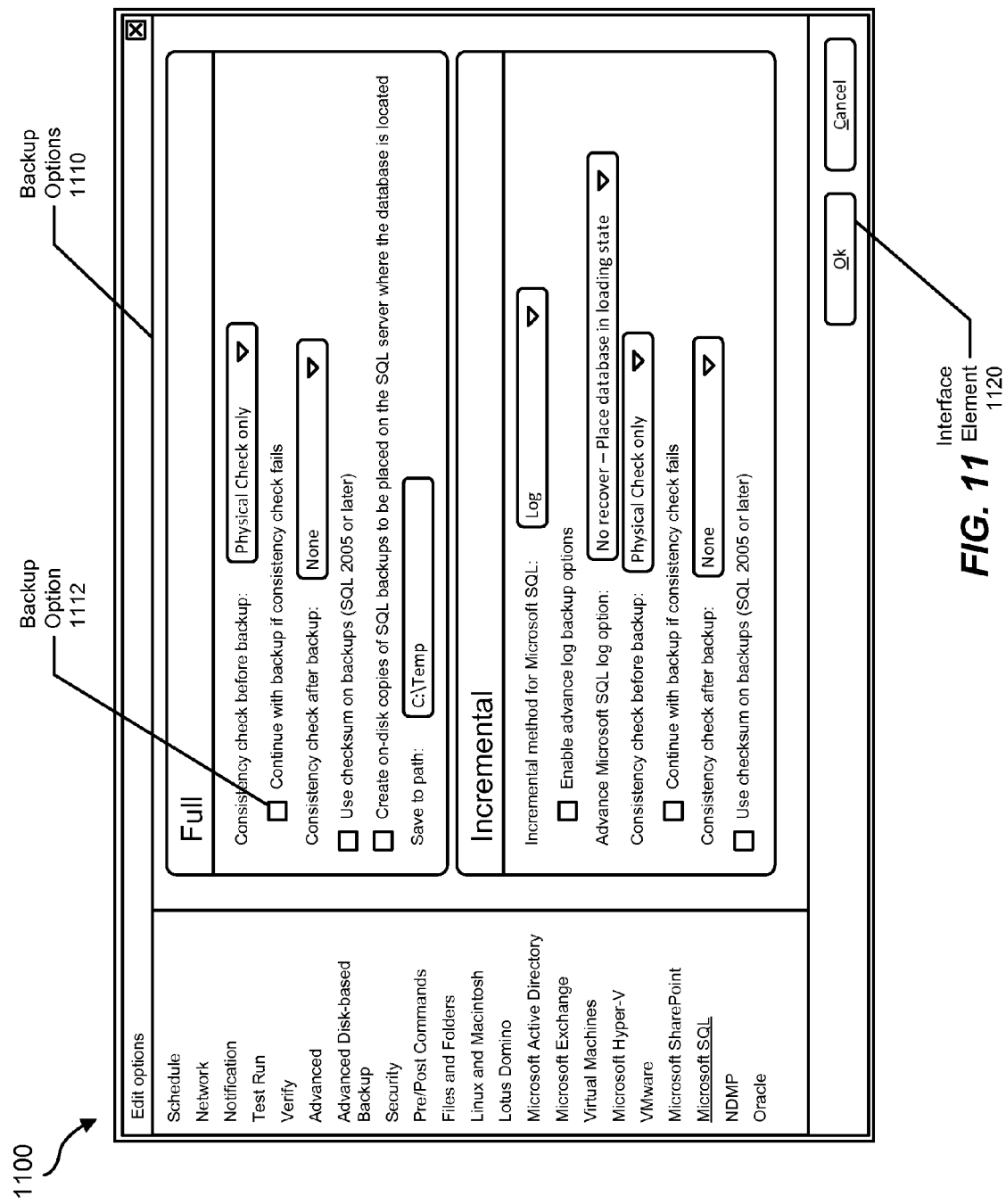
FIG. 11 is a diagram of an exemplary graphical user interface for simultaneously configuring multiple independent backups.

FIG. 11 is an illustration of an exemplary graphical user interface 1100. As shown in FIG. 11, exemplary graphical user interface 1100 may include backup options 1110. In this example, exemplary graphical user interface 1100 does not include any modification indicators, which indicates that the user has not yet made any modifications to any backup option within backup options 1110. In this example, if the user modifies backup option 1112 (by, e.g., clicking a checkbox next to backup option 1112) interface module 106 may display a modification indicator (e.g., modification indicator 1210 in FIG. 12) that indicates that the user has modified backup option 1112.

Figure 12:
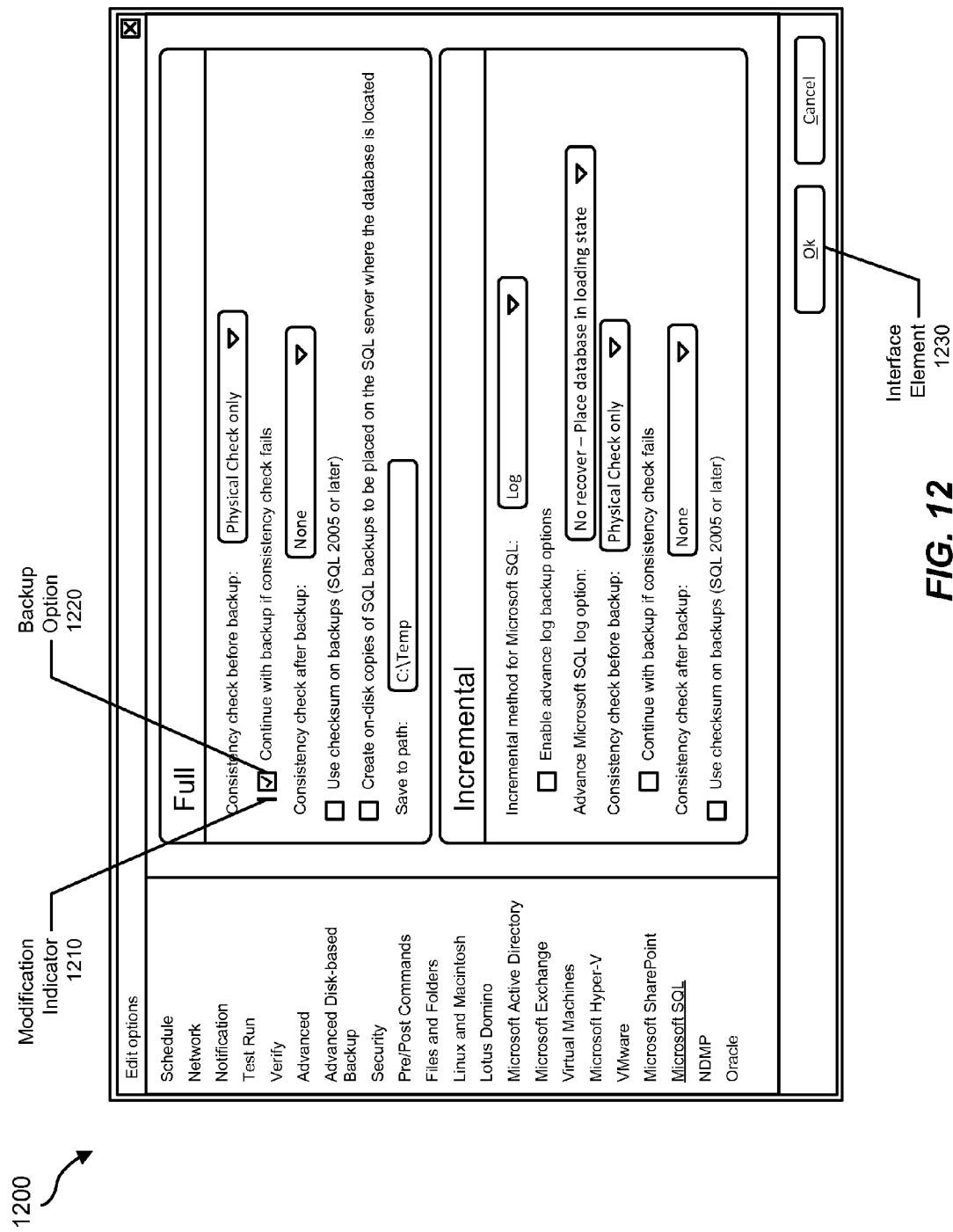
FIG. 12 is a diagram of an exemplary graphical user interface for simultaneously configuring multiple independent backups.

FIG. 12 is an illustration of an exemplary graphical user interface 1200. As shown in FIG. 12, exemplary graphical user interface 1200 may include a modification indicator 1210 and a backup option 1220. In this example, modification indicator 1210 indicates that the user has modified backup option 1220. The user may interact with modification indicator 1210 (by, e.g., clicking on or hovering over modification indicator 1210) to request information that identifies which backups will be or have been affected by the modification to backup option 1220. In response to this request, interface module 106 may display, to the user, graphical user interface 1300 in FIG. 13.

Figure 13:
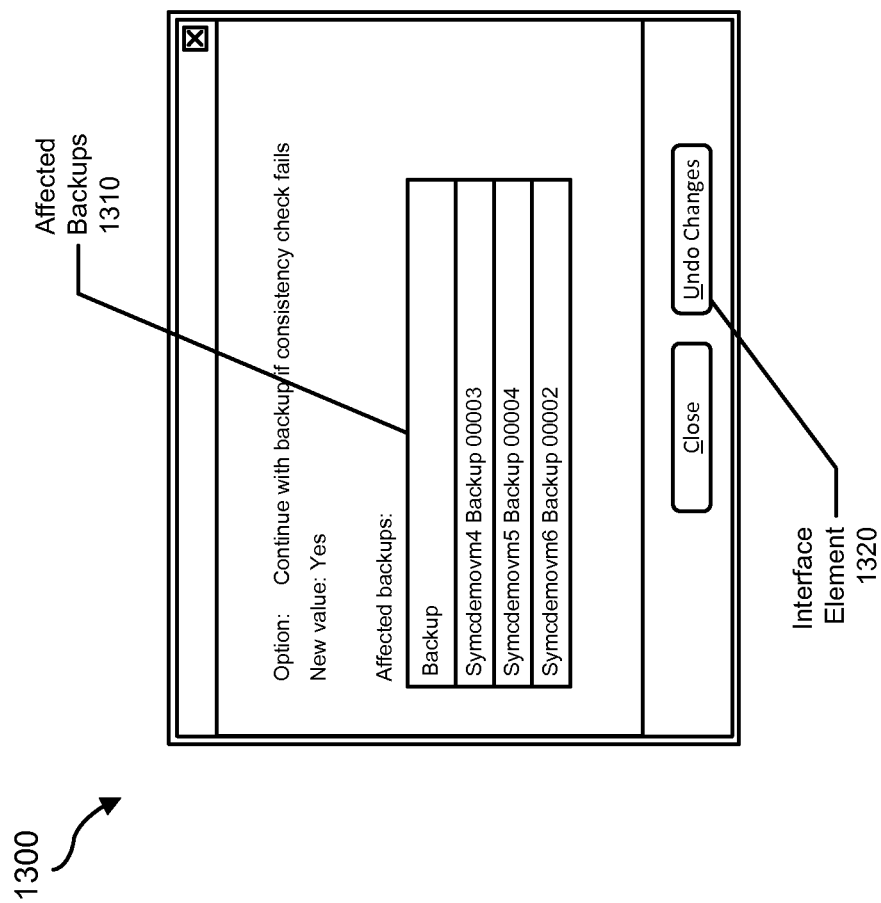
FIG. 13 is a diagram of an exemplary graphical user interface for simultaneously configuring multiple independent backups.

FIG. 13 is an illustration of an exemplary graphical user interface 1300. As shown in FIG. 13, exemplary graphical user interface 1300 may summarize a modification to a backup option. In this example, exemplary graphical user interface 1300 identifies a backup option that has been modified, a new value of the backup option (e.g., "Yes") and a list of affected backups 1310. Affected backups 1310 identifies which backups have been or will be affected by the modification to the backup option. In this example, affected backups 1310 indicates that there are three backups that have been or will be affected by the modification to backup option 1220 in FIG. 12. In some examples, the user may interact with an interface element 1320 (by, e.g., clicking an undo button) to undo the modification to the backup option.

As explained above, by allowing a user to simultaneously configure multiple independent backups, the systems and methods described herein may enable the user to efficiently manage complex backups across multiple computing resources without the complexity present with backup templates and shared configuration details. In some examples, these systems and methods may also allow a user to easily customize backups without the need for redundant effort.

Figure 14:
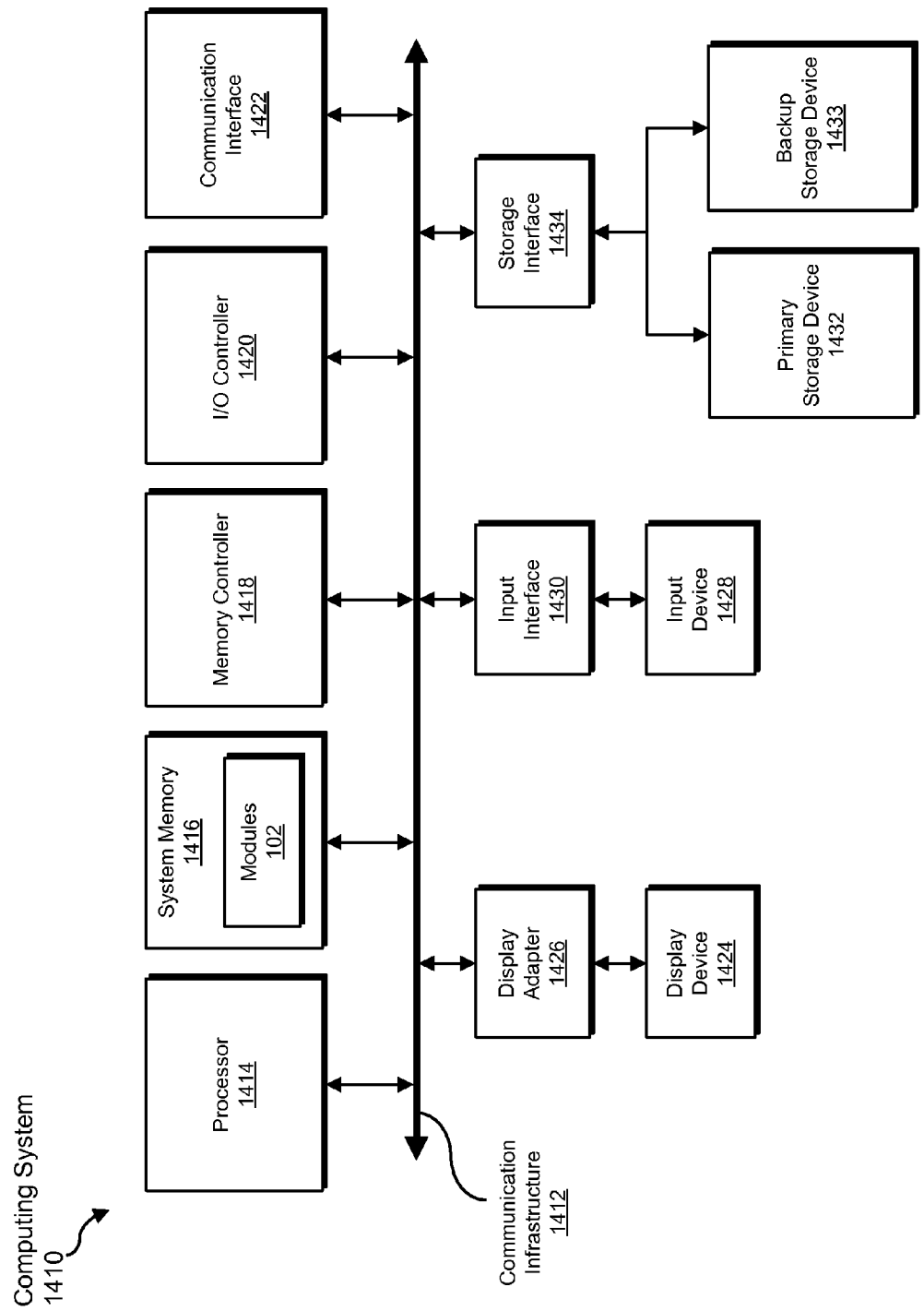
FIG. 14 is a block diagram of an exemplary computing system capable of implementing one or more of the embodiments described and/or illustrated herein.

FIG. 14 is a block diagram of an exemplary computing system 1410 capable of implementing one or more of the embodiments described and/or illustrated herein. For example, all or a portion of computing system 1410 may perform and/or be a means for performing, either alone or in combination with other elements, one or more of the configuring, identifying, providing, receiving, allowing, creating, updating and/or tracking steps described herein. All or a portion of computing system 1410 may also perform and/or be a means for performing any other steps, methods, or processes described and/or illustrated herein.

Computing system 1410 broadly represents any single or multi-processor computing device or system capable of executing computer-readable instructions. Examples of computing system 1410 include, without limitation, workstations, laptops, client-side terminals, servers, distributed computing systems, handheld devices, or any other computing system or device. In its most basic configuration, computing system 1410 may include at least one processor 1414 and a system memory 1416.

Processor 1414 generally represents any type or form of processing unit capable of processing data or interpreting and executing instructions. In certain embodiments, processor 1414 may receive instructions from a software application or module. These instructions may cause processor 1414 to perform the functions of one or more of the exemplary embodiments described and/or illustrated herein.

System memory 1416 generally represents any type or form of volatile or non-volatile storage device or medium capable of storing data and/or other computer-readable instructions. Examples of system memory 1416 include, without limitation, random access memory (RAM), read only memory (ROM), flash memory, or any other suitable memory device. Although not required, in certain embodiments computing system 1410 may include both a volatile memory unit (such as, for example, system memory 1416) and a non-volatile storage device (such as, for example, primary storage device 1432, as described in detail below). In one example, one or more of modules 102 from FIG. 1 may be loaded into system memory 1416.

In certain embodiments, exemplary computing system 1410 may also include one or more components or elements in addition to processor 1414 and system memory 1416. For example, as illustrated in FIG. 14, computing system 1410 may include a memory controller 1418, an Input/Output (I/O) controller 1420, and a communication interface 1422, each of which may be interconnected via a communication infrastructure 1412. Communication infrastructure 1412 generally represents any type or form of infrastructure capable of facilitating communication between one or more components of a computing device. Examples of communication infrastructure 1412 include, without limitation, a communication bus (such as an ISA, PCI, PCIe, or similar bus) and a network.

Memory controller 1418 generally represents any type or form of device capable of handling memory or data or controlling communication between one or more components of computing system 1410. For example, in certain embodiments memory controller 1418 may control communication between processor 1414, system memory 1416, and I/O controller 1420 via communication infrastructure 1412.

I/O controller 1420 generally represents any type or form of module capable of coordinating and/or controlling the input and output functions of a computing device. For example, in certain embodiments I/O controller 1420 may control or facilitate transfer of data between one or more elements of computing system 1410, such as processor 1414, system memory 1416, communication interface 1422, display adapter 1426, input interface 1430, and storage interface 1434.

Communication interface 1422 broadly represents any type or form of communication device or adapter capable of facilitating communication between exemplary computing system 1410 and one or more additional devices. For example, in certain embodiments communication interface 1422 may facilitate communication between computing system 1410 and a private or public network including additional computing systems. Examples of communication interface 1422 include, without limitation, a wired network interface (such as a network interface card), a wireless network interface (such as a wireless network interface card), a modem, and any other suitable interface. In at least one embodiment, communication interface 1422 may provide a direct connection to a remote server via a direct link to a network, such as the Internet. Communication interface 1422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1422 may also represent a host adapter configured to facilitate communication between computing system 1410 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 1422 may also allow computing system 1410 to engage in distributed or remote computing. For example, communication interface 1422 may receive instructions from a remote device or send instructions to a remote device for execution.

As illustrated in FIG. 14, computing system 1410 may also include at least one display device 1424 coupled to communication infrastructure 1412 via a display adapter 1426. Display device 1424 generally represents any type or form of device capable of visually displaying information forwarded by display adapter 1426. Similarly, display adapter 1426 generally represents any type or form of device configured to forward graphics, text, and other data from communication infrastructure 1412 (or from a frame buffer, as known in the art) for display on display device 1424.

As illustrated in FIG. 14, exemplary computing system 1410 may also include at least one input device 1428 coupled to communication infrastructure 1412 via an input interface 1430. Input device 1428 generally represents any type or form of input device capable of providing input, either computer or human generated, to exemplary computing system 1410. Examples of input device 1428 include, without limitation, a keyboard, a pointing device, a speech recognition device, or any other input device.

As illustrated in FIG. 14, exemplary computing system 1410 may also include a primary storage device 1432 and a backup storage device 1433 coupled to communication infrastructure 1412 via a storage interface 1434. Storage devices 1432 and 1433 generally represent any type or form of storage device or medium capable of storing data and/or other computer-readable instructions. For example, storage devices 1432 and 1433 may be a magnetic disk drive (e.g., a so-called hard drive), a solid state drive, a floppy disk drive, a magnetic tape drive, an optical disk drive, a flash drive, or the like. Storage interface 1434 generally represents any type or form of interface or device for transferring data between storage devices 1432 and 1433 and other components of computing system 1410.

In certain embodiments, storage devices 1432 and 1433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1432 and 1433 may also include other similar structures or devices for allowing computer software, data, or other computer-readable instructions to be loaded into computing system 1410. For example, storage devices 1432 and 1433 may be configured to read and write software, data, or other computer-readable information. Storage devices 1432 and 1433 may also be a part of computing system 1410 or may be a separate device accessed through other interface systems.

Many other devices or subsystems may be connected to computing system 1410. Conversely, all of the components and devices illustrated in FIG. 14 need not be present to practice the embodiments described and/or illustrated herein. The devices and subsystems referenced above may also be interconnected in different ways from that shown in FIG. 14. Computing system 1410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 1410. All or a portion of the computer program stored on the computer-readable-storage medium may then be stored in system memory 1416 and/or various portions of storage devices 1432 and 1433. When executed by processor 1414, a computer program loaded into computing system 1410 may cause processor 1414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1410 may be configured as an application specific integrated circuit (ASIC) adapted to implement one or more of the exemplary embodiments disclosed herein.

Figure 15:
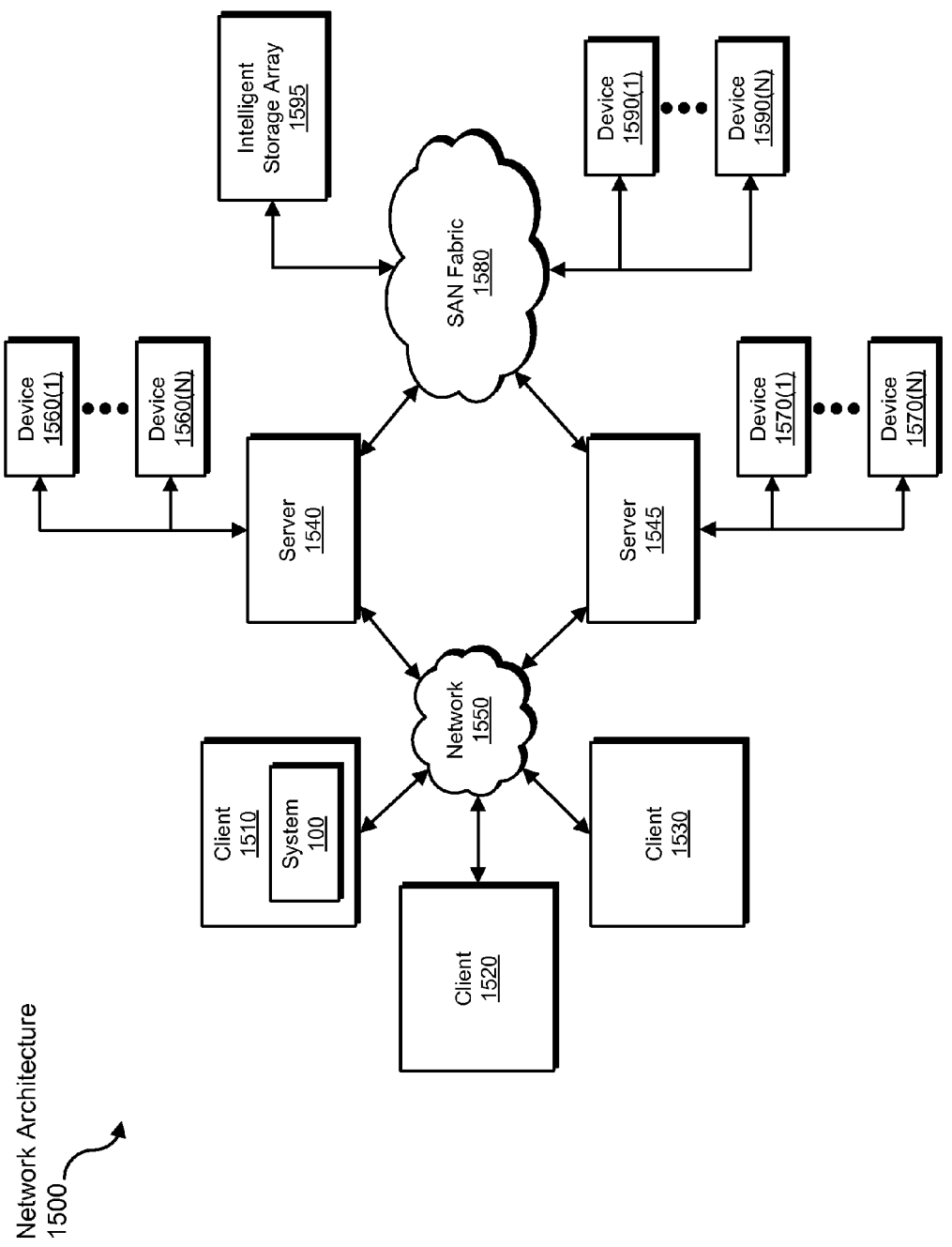
FIG. 15 is a block diagram of an exemplary computing network capable of implementing one or more of the embodiments described and/or illustrated herein.

FIG. 15 is a block diagram of an exemplary network architecture 1500 in which client systems 1510, 1520, and 1530 and servers 1540 and 1545 may be coupled to a network 1550. As detailed above, all or a portion of network architecture 1500 may perform and/or be a means for performing, either alone or in combination with other elements, one or more of the configuring, identifying, providing, receiving, allowing, creating, updating and/or tracking steps disclosed herein. All or a portion of network architecture 1500 may also be used to perform and/or be a means for performing other steps and features set forth in the instant disclosure.

Client systems 1510, 1520, and 1530 generally represent any type or form of computing device or system, such as exemplary computing system 1410 in FIG. 14. Similarly, servers 1540 and 1545 generally represent computing devices or systems, such as application servers or database servers, configured to provide various database services and/or run certain software applications. Network 1550 generally represents any telecommunication or computer network including, for example, an intranet, a wide area network (WAN), a local area network (LAN), a personal area network (PAN), or the Internet. In one example, client systems 1510, 1520, and/or 1530 and/or servers 1540 and/or 1545 may include all or a portion of system 100 from FIG. 1.

As illustrated in FIG. 15, one or more storage devices 1560(1)-(N) may be directly attached to server 1540. Similarly, one or more storage devices 1570(1)-(N) may be directly attached to server 1545. Storage devices 1560(1)-(N) and storage devices 1570(1)-(N) generally represent any type or form of storage device or medium capable of storing data and/or other computer-readable instructions. In certain embodiments, storage devices 1560(1)-(N) and storage devices 1570(1)-(N) may represent network-attached storage (NAS) devices configured to communicate with servers 1540 and 1545 using various protocols, such as NFS, SMB, or CIFS.

Servers 1540 and 1545 may also be connected to a storage area network (SAN) fabric 1580. SAN fabric 1580 generally represents any type or form of computer network or architecture capable of facilitating communication between a plurality of storage devices. SAN fabric 1580 may facilitate communication between servers 1540 and 1545 and a plurality of storage devices 1590(1)-(N) and/or an intelligent storage array 1595. SAN fabric 1580 may also facilitate, via network 1550 and servers 1540 and 1545, communication between client systems 1510, 1520, and 1530 and storage devices 1590(1)-(N) and/or intelligent storage array 1595 in such a manner that devices 1590(1)-(N) and array 1595 appear as locally attached devices to client systems 1510, 1520, and 1530. As with storage devices 1560(1)-(N) and storage devices 1570(1)-(N), storage devices 1590(1)-(N) and intelligent storage array 1595 generally represent any type or form of storage device or medium capable of storing data and/or other computer-readable instructions.

In certain embodiments, and with reference to exemplary computing system 1410 of FIG. 14, a communication interface, such as communication interface 1422 in FIG. 14, may be used to provide connectivity between each client system 1510, 1520, and 1530 and network 1550. Client systems 1510, 1520, and 1530 may be able to access information on server 1540 or 1545 using, for example, a web browser or other client software. Such software may allow client systems 1510, 1520, and 1530 to access data hosted by server 1540, server 1545, storage devices 1560(1)-(N), storage devices 1570(1)-(N), storage devices 1590(1)-(N), or intelligent storage array 1595. Although FIG. 15 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1540, server 1545, storage devices 1560(1)-(N), storage devices 1570(1)-(N), storage devices 1590(1)-(N), intelligent storage array 1595, or any combination thereof. All or a portion of one or more of the exemplary embodiments disclosed herein may also be encoded as a computer program, stored in server 1540, run by server 1545, and distributed to client systems 1510, 1520, and 1530 over network 1550.

As detailed above, computing system 1410 and/or one or more components of network architecture 1500 may perform and/or be a means for performing, either alone or in combination with other elements, one or more steps of an exemplary method for simultaneously configuring multiple independent backups.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature, since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system capable of simultaneously configuring multiple independent backups.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for simultaneously configuring multiple independent backup scripts, at least a portion of the method being performed by a computing device comprising at least one processor, the method comprising:
   identifying a backup environment managed by a backup system;
   identifying a request from a user to modify each backup script within a plurality of backup scripts within the backup environment, wherein each backup script within the plurality of backup scripts specifies, independent of any other backup script, a backup operation to be performed by the backup system on a computing resource within the backup environment;
   in response to the request to modify each backup script within the plurality of backup scripts, providing a graphical user interface that allows the user to simultaneously modify at least one backup option for each backup script within the plurality of backup scripts;
   receiving a request, from the user via the graphical user interface, to simultaneously update at least one modified backup option for each backup script within the plurality of backup scripts;
   in response to the request to simultaneously update the modified backup option for each backup script within the plurality of backup scripts, updating, independent of any other backup option of the plurality of backup scripts, the modified backup option for each backup script within the plurality of backup scripts, wherein each backup script within the plurality of backup scripts remains independent of any other backup script within the plurality of backup scripts.

2. The method of claim 1, tangibly embodied as computer-executable instructions on at least one non-transitory computer-readable-storage medium.

3. The method of claim 1, wherein allowing the user to simultaneously modify the backup option for each backup script within the plurality of backup scripts comprises displaying to the user via the graphical user interface a number of backup scripts within the plurality of backup scripts that will be affected by a modification to the backup option.

4. The method of claim 1, wherein allowing the user to simultaneously modify the backup option for each backup script within the plurality of backup scripts comprises displaying to the user via the graphical user interface a variation indicator for the backup option that visually indicates whether the backup option varies among any backup scripts within the plurality of backup scripts.

5. The method of claim 1, wherein allowing the user to simultaneously modify the backup option for each backup script within the plurality of backup scripts comprises displaying to the user via the graphical user interface a modification indicator that visually indicates when the backup option has been modified by the user.

6. The method of claim 1, wherein allowing the user to simultaneously modify the backup option for each backup script within the plurality of backup scripts comprises at least one of:
   displaying to the user via the graphical user interface information that identifies which of the plurality of backup scripts will be affected by a modification to the backup option;
   allowing the user to undo the modification to the backup option.

7. The method of claim 1, wherein allowing the user to simultaneously modify the backup option for each backup script within the plurality of backup scripts comprises displaying to the user via the graphical user interface a modification summary that identifies at least one of:
   a modification to the backup option of the plurality of backup scripts;
   what backup options have been modified;
   what backup scripts within the plurality of backup scripts are affected by the modification to the backup option of the plurality of backup scripts.

8. The method of claim 1, further comprising:
   separately tracking, for each backup script within the plurality of backup scripts, a modification to the backup option;
   allowing the user to separately undo, for each backup script within the plurality of backup scripts, the modification to the backup option.

9. The method of claim 1, wherein identifying the request from the user to modify each backup script within the plurality of backup scripts within the backup environment comprises at least one of:
   allowing the user to select a plurality of computing resources from within the backup environment;
   identifying a request from the user to modify at least one backup script for each of the plurality of computing resources, the backup script for each of the plurality of computing resources comprising the plurality of backup scripts.

10. A system for simultaneously configuring multiple independent backup scripts, the system comprising:
   an identification module programmed to:
      identify a backup environment managed by a backup system;
      identify a request from a user to modify each backup script within a plurality of backup scripts within the backup environment, wherein each backup script within the plurality of backup scripts specifies, independent of any other backup script, a backup operation to be performed by the backup system on a computing resource within the backup environment;
   an interface module programmed to:
      in response to the request to modify each backup script within the plurality of backup scripts, provide a graphical user interface that allows the user to simultaneously modify at least one backup option for each backup script within the plurality of backup scripts;
      receive a request, from the user via the graphical user interface, to simultaneously update at least one modified backup option for each backup script within the plurality of backup scripts;
   a backup-configuration module programmed to, in response to the request to simultaneously update the modified backup option for each backup script within the plurality of backup scripts, update, independent of any other backup option of the plurality of backup scripts, the modified backup option for each backup script within the plurality of backup scripts, wherein each backup script within the plurality of backup scripts remains independent of any other backup script within the plurality of backup scripts;

at least one processor configured to execute the identification module, the interface module, and the backup-configuration module.

11. The system of claim 10, wherein the interface module allows the user to simultaneously modify the backup option for each backup script within the plurality of backup scripts by displaying to the user via the graphical user interface a number of backup scripts within the plurality of backup scripts that will be affected by a modification to the backup option.

12. The system of claim 10, wherein the interface module allows the user to simultaneously modify the backup option for each backup script within the plurality of backup scripts by displaying to the user via the graphical user interface a variation indicator for the backup option that visually indicates whether the backup option varies among any backup scripts within the plurality of backup scripts.

13. The system of claim 10, wherein the interface module allows the user to simultaneously modify the backup option for each backup script within the plurality of backup scripts by displaying to the user via the graphical user interface a modification indicator that visually indicates when the backup option has been modified by the user.

14. The system of claim 10, wherein the interface module allows the user to simultaneously modify the backup option for each backup script within the plurality of backup scripts by performing at least one of:
displaying to the user via the graphical user interface information that identifies which of the plurality of backup scripts will be affected by a modification to the backup option;
allowing the user to undo the modification to the backup option.

15. A computer-implemented method for simultaneously configuring multiple independent backup scripts, at least a portion of the method being performed by a computing device comprising at least one processor, the method comprising:
identifying a backup environment managed by a backup system;
identifying a request from a user to create a plurality of backup scripts within the backup environment, wherein each backup script within the plurality of backup scripts specifies, independent of any other backup script, a backup operation to be performed by the backup system on a computing resource within the backup environment;
in response to the request to create the plurality of backup scripts, providing a graphical user interface that allows the user to simultaneously create, via the graphical user interface, a backup configuration for the plurality of backup scripts, wherein the backup configuration identifies the backup operation to be performed by the backup system on the computing resource specified by each backup script within the plurality of backup scripts;
receiving a request, from the user via the graphical user interface, to simultaneously create each backup script within the plurality of backup scripts according to the backup configuration for the plurality of backup scripts;
in response to the request to simultaneously create each backup script within the plurality of backup scripts, independently creating, based at least in part on the backup configuration, each backup script within the plurality of backup scripts, wherein each backup script within the plurality of backup scripts is created independent of any other backup script within the plurality of backup scripts.

16. The method of claim 15, wherein allowing the user to create the backup configuration for the plurality of backup scripts comprises allowing the user to configure at least one backup option of the backup configuration for the plurality of backup scripts.

17. The method of claim 15, tangibly embodied as computer-executable instructions on at least one non-transitory computer-readable-storage medium.

18. The method of claim 15, wherein identifying the request from the user to create the plurality of backup scripts within the backup environment comprises at least one of:
allowing the user to select a plurality of computing resources from within the backup environment;
identifying a request from the user to create at least one backup script for each of the plurality of computing resources, the backup script for each of the plurality of computing resources comprising the plurality of backup scripts.

* * * * *